United States Patent Office 2,773,085
Patented Dec. 4, 1956

2,773,085

PRODUCTION OF CARBON MONOXIDE HYDROGENATION PRODUCTS WITH A HIGH CONTENT OF OXYGENOUS COMPOUNDS

Walter Rottig, Oberhausen-Sterkrade-Nord, Germany, assignor to Ruhrchemie Aktiengesellschaft, Oberhausen-Holten, and Lurgi Gesellschaft für Waermetechnik m. b. H., Frankfurt am Main, Heddernheim, Germany No Drawing. Application March 10, 1951,
Serial No. 215,010

Claims priority, application Germany March 24, 1950

12 Claims. (Cl. 260—449.6)

This invention relates to improvements in the production of carbon monoxide hydrogenation products having a high content of oxygenous compounds.

Oxygenous compounds and in particular alcohols may be obtained in larger or smaller quantities, in addition to hydrocarbons in carbon monoxide hydrogenation. This is effected by the use of special iron catalysts and by the application of increased synthesis pressures and suitable synthesis conditions. These special iron catalysts are conventionally produced by the smelting process and contain aluminum oxide and small quantities of alkalies as their activating ingredients. Precipitated catalysts are also known which consist chiefly of iron and contain small quantities of copper, manganese or rare earths as activating ingredients. These special catalysts produce larger quantities of oxygenous synthesis products. These iron catalysts, in addition, generally contain larger quantities of kieselguhr or similar inert carrier materials whose quantity amounts to about 50–100% of the iron content. By the use of these catalysts yields of alcohols and other oxygenous compounds amounting to 50–60% of the normal liquid synthesis products are obtained. All such catalysts contain only comparatively small quantities of alkalies, such as potassium hydroxide or potassium carbonate.

One object of this invention, among others, is to increase the yield of oxygenous compounds in the products obtained from carbon monoxide hydrogenation.

This and further objects will become apparent from the following description and the examples.

It has now been found that in the hydrogenation of carbon monoxide with the use of iron catalysts, yields of more than 60% oxygenous compounds can be obtained in the synthesis products if the synthesis gases contain at least 1.2 parts, and preferably 1.5 to 2 parts by volume of hydrogen to one part by volume of carbon monoxide, and are conducted over special precipitated iron catalysts. The special precipitated iron catalysts, according to the invention, contain a free alkali oxide, the amount of which present in relation to the iron content and calculated as $K_2O$, is more than 5% and preferably between 8 and 12% of $K_2O$. Alkali compounds of non-volatile acids, such as alkali silicate, are not likely to be used for the adjustment of the alkali content in the catalyst in accordance with the invention. According to the prior art, the introduction of alkali silicate in the catalyst results in products of the carbon monoxide hydrogenation consisting preferably of hydrocarbons. These catalysts do not contain any carrier material or may contain small amounts of carrier material not exceeding 20%. The catalysts may also be activated with copper, silver or metals of the fifth, sixth and seventh group of the periodic table. When proceeding according to the invention the synthesis may be carried out in the gaseous, as well as, in the liquid phase. It is also possible, according to the invention, to use the so-called "fluidized" process in which the catalyst is dispersed as small particles.

The new catalysts according to the invention, even at low temperatures, show an activity which heretofore had not been attainable with iron catalysts. As the catalytic conversion of gas mixtures containing carbon monoxide and hydrogen will produce very high yields of oxygenous compounds, especially alcohols, only at low synthesis temperatures, yields of these oxygenous compounds heretofore unobtainable may be obtained with the iron catalyst according to the invention, especially by a synthesis carried out in several stages or by leading the synthesis gases through a circular path. The highest yields of the oxygenous compounds can be obtained with synthesis gases which are rich in hydrogen, and which contain at least 1.2 parts and preferably 2 or more parts by volume of hydrogen for each unit part by volume of carbon monoxide. The iron catalysts conventionally known and used will under these conditions show a decrease in the alcohol yield and an undesirable high formation of methane. This decrease in the alcohol yield is due to the hydrogenation into saturated hydrocarbons by the conventional catalysts under these conditions.

If the same catalysts are activated with an alkali in the form of sodium compounds, e. g. hydroxide or carbonate and with potassium compounds of an analogous composition, it is observed that by the use of the latter, considerably more esters are formed than by the use of the former. Conversely, the use of sodium compounds produces large quantities of alcohol and only small quantities of esters. This fact is of considerable importance in the technical exploitation of the process according to the invention, since it makes possible the production of primary products with larger or smaller amounts of esters or increased or reduced amounts of alcohols, whichever are desired. Thus, simply by changing the catalyst, while allowing the other synthesis conditions to remain the same, products with a high or low ester content and a correspondingly reduced or increased alcohol content may be obtained. This specific effect of the various alkalies in the catalyst used for the hydrogenation is especially important for precipitation catalysts, though it is also of importance for smelting and sintering catalysts.

The iron catalysts according to the invention, which permit synthesis temperatures of 150 to 200° C. are produced by precipitating a hot aqueous solution of iron nitrate or other nitrate salts and soluble salts of the activators with hot soda or potash solution. In addition to soda and potash, other alkali compounds, such as soda or potassium lye are suitable as precipitants. The precipitation suitably takes place in the alkaline range, i. e. between a pH of 9 to 11.

The high alkali contents required according to the invention may be obtained by a partial washing out of the precipitated catalyst's sludge. Such a partial wash may be carried out, for example, by washing out the moist catalyst mass, which had been freed from the mother liquor in a filter press, for a period of time sufficient to have the desired alkali content as residual alkali, the wash being carried out by repressing hot condensate. However, in many cases it is advantageous if the washing of the precipitated sludge is not stopped at an alkalinity of 5 to 12% $K_2O$, but is carried through in a conventional manner of manufacture, as far as is possible, e. g. to a residual content of 0.5 to 1% of $K_2O$, and a subsequent impregnation with suitable alkali compounds is effected. Since a certain content of free alkali in the catalyst is required, alkali salts of non-volatile acids, such as alkali silicate, can not be used for this impregnation, as is self-evident. Following this procedure it is particularly advantageous if the catalyst is to be impregnated with alkali compounds which are so valuable that their excessive use for precipitation entails large expense. Thus, this procedure should be followed if impregnation with lithium or other homologues of potassium is to be done. This particular procedure has also been found effective if several alkalies are to be used in the catalysts at the same time.

The technical execution of the impregnation of the moist catalyst mass may be carried out by any of the known methods, such as by stirring in a suspension container, by mixing in a stirring apparatus or by use of a kneading machine. The alkali compounds to be used may be in a solid, dissolved or suspended state.

When the moist catalyst mass through partial washing or complete washing and subsequent impregnation has been brought to the desired alkali content, it may be dried in the usual manner and shaped. The shaping of the catalyst may be done in a thread or cord press. Other arrangements for shaping may also be used.

When shaping the catalyst mass the production of a catalyst grain with the greatest possible firmness must be attempted. The length of the life of the catalysts depends to a great extent on their firmness. If the grain is too soft, the catalyst will tend to form a sludge due to the more or less extensive disintegration of the grains. This disintegration of the grain may be prevented to a large extent if the shaping is performed under as high a pressure as is possible. In many cases, the addition of small amounts of inert carrier substances, such for example as kieselguhr, "Tonsil" or bleaching clay will improve the firmness of the grain. This addition of the inert carrier material should be carried out, however, so that the content of these products never exceeds 20% of the iron content of the catalyst. It is important that this amount never be exceeded as the addition of inert substances always results in an undesirable increase in the synthesis temperature. The inert ingredient used may be added during the precipitation or just before the shaping of the catalyst.

If the catalyst is divided into threads, the unreduced grain should have a size of about 3–8 mm. and preferably 4–5 mm. A smaller grain size will tend to form splinters or extra small grains due to the shrinkage of the grain size during the reduction of the catalyst. This shrinkage in the size of the grain may at times be as great as 50% and more of the original volume of the grain. Thus a grain having an initial size of 2 mm. may under certain circumstances be reduced to a size of only about 0.5 to 1.0 mm. Catalyst grains of such small size tend to disintegrate a great deal. When using a formed catalyst grain of 4 mm. size, the grain size of the reduced catalyst will be about 2 mm. which is sufficiently large to prevent disintegration. The formed catalyst grains are continuously dehydrated, or dehydrated in stages on a band in a drying oven. The drying process is carried out at a temperature of between 80 and 150° C., and preferably at about 110° C. At the beginning of the drying process the temperature must not exceed 110° because a too rapid escape of steam may damage the structure of the catalyst grain to such an extent that the catalyst during reduction, and particularly during synthesis, tends to disintegrate at an increased rate. It is preferable to discontinue the drying of the catalyst when the residual water content reaches about 4–6%.

The shaped and dried catalyst must be reduced in a suitable manner. Practically all known reduction methods are suitable. Especially favorable catalyst properties result if the reduction is carried out with pure hydrogen or with mixtures of hydrogen or nitrogen, such as used in the synthesis of ammonia. With the iron catalyst used according to the invention, it is possible to obtain low synthesis temperatures and, thus, especially high yields of oxygenous compounds if the reduction is carried through to a content of free iron of about 60% Fe, preferably of more than 80% Fe, relative to the total iron present. The temperature range lies between 250–350°, preferably at 300°. During the reduction, the linear speed of the reduction gases should be 30–150 cm./sec., preferably 100 cm./sec. at 760 mm. Hg and 0° C.

With the iron catalyst used according to the invention good yields in oxygenous products can be obtained from all gases containing carbon monoxide and hydrogen. The use of gases rich in hydrogen is particularly suitable, as mentioned above. This is in contrast to the prior art which places a special value on the use of gases rich in carbon monoxide in the manufacture of oxygenous synthesis products.

The catalysts described can be used considerably above the normal load of 100 parts by volume of gas per 1 part by volume of catalyst per hour, e. g. with 400 parts by volume of gas per 1 part by volume of catalyst per hour. In this, correspondingly higher temperatures of synthesis can be used, without any appreciable reduction in the yield of oxygenous compounds. This is also in contrast to the catalyst known up to now.

With the catalyst used according to the invention high $(CO+H_2)$ conversions may be obtained in a single stage operation. It is, however, considerably more advantageous to use a two or three stage operation. When so proceeding, conversions of 90% $(CO+H_2)$, and more, can be obtained without difficulty. At a synthesis pressure of between 10–100 kgs./cm.$^2$, and preferably between 20–50 kgs./cm.$^2$, yields of about 190–210 gms./cubic m. at 760 mm. Hg and 20° C. can be obtained. These high yields were technically impossible heretofore. This is due to the fact that synthesis pressures considerably above 10 kg./cm.$^2$ have the advantage of a considerably higher conversion. If a constant conversion rate is desired, the synthesis temperature can be lowered considerably. In this connection the ratio of making up CO and $H_2$ may be influenced towards an increased $H_2$ consumption. Considering the favorable properties of gases rich in hydrogen, this appears to be particularly advantageous.

In an operation in several stages it is advantageous to wash out the carbon dioxide at least after the second, but preferably after the first, stage. In this way, a synthesis gas with a high content of carbon monoxide and hydrogen is provided for each stage. If the gas has a sufficiently high hydrogen content before the last stage, this stage can be operated in a straight path, not a circular path.

In contrast to technical methods of today, in the process according to the invention for the manufacture of products with a high content of oxygenous compounds, leading the gases through a circular path is advantageous. In the circular movement, the ratio of 1 part by volume of fresh gas to 1–10 parts by volume of returning gas, and preferably 1 part by volume of fresh gas to 3–5 parts by volume of returning gas is used. In this circular procedure, an increase of the temperature is not required. By keeping the temperature constant, the conversion according to the invention is somewhat increased by the use of the circular path. Particularly, the consumption rate is considerably improved. This fact is especially advantageous for the catalysts used according to the invention because, with their assistance, gases rich in hydrogen can be converted particularly well and produce high yields of oxygenous compounds. By this method a conversion up to 90% $(CO+H_2)$ can be obtained. Known catalysts, which work with gases rich in carbon monoxide, can not be used for such high $(CO+H_2)$ conversions because, by using the circular path, the conversion ratio is changed toward an increased consumption of hydrogen.

For the process, according to the invention, it is of utmost importance that the heat of reaction is carried off thoroughly and quickly. To carry out the synthesis, the technically well-known carbon monoxide hydrogenation oven with double or single pipes, with diameters of 10–20 mm., can be used.

The following examples are given by way of illustration and not limitation.

Example 1

An iron catalyst, containing 100 parts of iron (Fe), 5 parts of copper (Cu), 10 parts of calcium oxide (CaO) and 10 parts of kieselguhr, was precipitated out of a solution of metallic nitrates by means of a boiling soda solution. At the completion of the precipitation, the pH was 9.2. The precipitated mass was immediately pressed into a filter press and separated from the mother lye by filtration. The filter-cake was partially washed with distilled water (water of condensation) to a residual alkali contents which, calculated as $K_2O$ and relative to the iron contents, was 8.4% $K_2O$. The partially washed mass was pre-dried to a residual water content of 60% $H_2O$ and shaped into threads, 3.5 mm. thick, in a thread press. The catalyst shaped in this manner was then completely dried at 110°, crushed into small pieces and screened through a sieve.

This catalyst was reduced, in a suitable reduction apparatus, with a gas mixture, consisting of 75% hydrogen and 25% nitrogen, at a temperature of 310° C. with a linear speed which, calculated cold, was 1.20 m./sec. The reduction lasted 90 minutes. The catalyst contained 70% of free iron, relative to the total iron contents.

When this catalyst was operated hourly with 100 (760 mm. Hg 20° C.) liter of water gas per 1 liter of catalyst ($CO:H_2=1:1.2$) at a circular path ratio of 1 part by volume fresh gas with 3 parts by volume of return gas under a pressure of 30 kg./cm.$^2$, synthesis products with a total contents of oxygenous compounds of 64% were obtained. When, under the same conditions, instead of water gas, a synthesis gas was processed, with the ratio $CO:H_2=1:2$, the yield of oxygenous compounds was increased to 73%. When processing a gas mixture, whose ratio of carbon monoxide:hydrogen was 1:0.85, the yield of oxygenous compounds was decreased to 53%. In all these cases, the ($CO+H_2$) conversion was about 57%.

Example 2

A catalyst, which consisted of 100 parts Fe, 10 parts Cu and 10 parts of kieselguhr, was precipitated out of a solution of suitable metallic nitrates by means of a hot soda solution at a pH of 9.2. The precipitated mass was immediately separated from the mother liquor in a filter press and washed to a residual alkali content of 1% calculated as $K_2O$ (relative to the iron present). Thereupon the mass was impregnated with a potash solution in such a manner that the finished catalyst (calculated as $K_2O$ and relative to the iron contents) showed an alkali content of 7% $K_2O$. Then the mass was pressed through a sieve into granules of 3–4 mm. and dried to a residual water content of about 6% at a temperature of 110° C.

This catalyst was reduced for 3 hours at 310° with a gas mixture, which contained 75% hydrogen and 25% nitrogen. The reduction gases had a linear speed of 1.4 m./sec. The reduction value, calculated as free iron and relative to the total iron contents, was 78%.

When this catalyst was operated in a straight path hourly with 100 liter water gas ($CO:H_2=1:1.2$) per 1 liter of catalyst at a pressure of 20 kg./cm.$^2$, the liquid synthesis products contained nearly 62% of oxygenous compounds. With a synthesis gas, whose ratio was $CO:H_2=1:2.0$, the contents of oxygenous compounds was increased to about 75%. With a gas rich in carbon monoxide ($CO:H_2=1:0.85$), only 55% of oxygenous compounds were obtained. The $CO+H_2$ conversion was between 58–60% in all these cases.

Example 3

4 catalysts were made whose basic composition was 100 Fe, 5 Cu and 10 CaO. The catalysts were made out of a boiling solution of the above mentioned nitrates by means of a boiling soda solution at a pH of about 9. The residual alkali was practically entirely removed by a subsequent thorough washing whereupon they were impregnated in such a manner that 10 parts, calculated as $K_2O$ in the form of (1) KOH, (2) $K_2CO_3$, (3) NaOH, (4) $Na_2CO_3$ were brought into 100 parts of iron.

The catalyst mass was subsequently dried for 24 hours at temperatures between 100 and 110° C. and was reduced for 4 hours with hydrogen at a linear speed of 1.3 m./sec. at temperatures around 310° C. The free iron content of all catalysts was approximately 45–50%. The catalysts were used for the synthesis in an experimental oven, with a 5 liter catalysts-volume. The synthesis pressure was 20 atmospheres, the gas load was 100/catalyst volume/hour. A circular motion ratio of 1:1 was used.

(1) The catalyst, which was impregnated with KOH, at a reaction temperature of 204° C. yielded a $CO+H_2$ conversion of 58%. The reaction product contained about 17% esters and 30% alcohols besides other oxygenous compounds, most of which were dissolved in the aqueous phase.

(2) The catalyst, which was impregnated with $K_2CO_3$, yielded a $CO+H_2$ conversion of 53% at a temp. of 221° C. The reaction product contained about 20% of esters and 27% of alcohols beside other oxygenous compounds, most of which were dissolved in the aqueous phase.

(3) The catalyst, which was impregnated with NaOH, yielded a $CO+H_2$ conversion of 59% at a temperature of 213° C. The reaction product contained about 38% of alcohols, about 10% of esters, beside other oxygenous compounds, most of which were dissolved in the aqueous phase.

(4) The reaction temperature of the catalyst, which was impregnated with $Na_2CO_3$, was 224° C., and the $CO+H_2$ yield was 57%. The reaction product contained 42% of alcohols and 7% of esters beside other oxygenous compounds, most of which were dissolved in the aqueous phase.

I claim:

1. Method for the catalytic hydrogenation of carbon monoxide with the production of synthesis products containing more than 60% oxygenous compounds which comprises contacting a synthesis gas which contains at least 1.2 parts by volume of hydrogen for each part by volume of carbon monoxide with a precipitated iron catalyst at elevated temperature at a pressure of about 10 to 100 atmospheres in excess of atmospheric pressure, said precipitated iron catalyst containing a free alkali oxide calculated as $K_2O$ present in amounts of about 5 to 12% $K_2O$ and being substantially free from alkali compounds of non-volatile acids, and containing 0–20% of an inert carrier based on the iron present, said catalyst being reduced with a hydrogen-containing gas at a temperature of about 250 to 350° C. prior to said contacting to a reduction value of at least 60%, and recovering carbon monoxide hydrogenation synthesis products containing more than 60% oxygenous compounds.

2. Method according to claim 1, in which the synthesis gas contains about 1.5 to 2 parts by volume of hydrogen for each unit part by volume of carbon monoxide and said alkali oxide is present in amount calculated as $K_2O$ of about 8–12% $K_2O$.

3. Method according to claim 1, in which said catalyst contains an inert carrier present in amount not exceeding 20% of the iron present.

4. Method according to claim 1, in which the iron catalyst is dried at 80–150° C. to a residual water content of 4–7% prior to said contacting.

5. Improvement according to claim 4, in which said catalyst is dried at a temperature of 110° C. prior to said contacting.

6. Method according to claim 1, in which said catalyst contains an amount of inert carrier material not exceeding 20% by volume of the iron present, said inert carrier material being added during shaping of the iron catalyst and being at least one member of the group consisting of kieselguhr, ceramic masses and bleaching clays.

7. Method according to claim 1, in which said reduction is effected at gas speeds of 30–150 cm./sec.

8. Improvement according to claim 1, in which said reduction is effected at a temperature of 300° C. and a gas speed of about 100 cm./sec.

9. Method, according to claim 1, in which said contacting is effected at a pressure of about 20–50 kgs./cm$^2$.

10. Method according to claim 1, in which the synthesis gas is present in amount of at least 200 parts by volume for each unit part by volume of catalyst per hour.

11. Method according to claim 1, in which said contacting is effected in the liquid phase.

12. Method according to claim 1, in which the catalyst is present as finely dispersed particles.

References Cited in the file of this patent

UNITED STATES PATENTS

| | | |
|---|---|---|
| 1,801,382 | Wietzel et al. | Apr. 21, 1931 |
| 2,220,261 | Michael et al. | Nov. 5, 1940 |
| 2,257,457 | Fischer et al. | Sept. 30, 1941 |
| 2,392,750 | Linn | Jan. 8, 1946 |
| 2,464,480 | Beck et al. | Mar. 15, 1949 |
| 2,467,282 | Warner | Apr. 12, 1949 |
| 2,471,129 | Vesterdal | May 24, 1949 |
| 2,498,838 | Griffen | Feb. 28, 1950 |
| 2,567,295 | Milligan et al. | Sept. 11, 1951 |
| 2,598,647 | McGrath | May 27, 1952 |
| 2,615,910 | Cier | Oct. 28, 1952 |
| 2,617,774 | Rottig et al. | Nov. 11, 1952 |
| 2,628,969 | Rottig | Feb. 17, 1953 |
| 2,660,599 | Rottig | Nov. 24, 1953 |

OTHER REFERENCES

Pichler: "Lecture and Discussion on Iron Catalysts for the Middle-Pressure Synthesis," PB Report 22,491 (pages 13–14), June 29, 1948.

Storch et al.: "Synthetic Liquid Fuels from Hydrogenation of Carbon Monoxide," Bureau of Mines publication No. 709, U. S. Government Printing Office, 1948, pages 38–39.

Storch et al.: "Fischer-Tropsch and Related Synthesis," Wiley & Sons, New York (1951), pages 223, 224, 239–241, 258–260, 383–385.